US012724385B2

(12) United States Patent
Kudli et al.

(10) Patent No.: US 12,724,385 B2
(45) Date of Patent: Sep. 1, 2026

(54) DRIFT DETECTION IN DYNAMIC PROCESSES

(71) Applicant: DIMAAG-AI, Inc., Fremont, CA (US)

(72) Inventors: Rajaram Kudli, Bengaluru (IN); Satish Padmanabhan, Sunnyvale, CA (US); Fuk Ho Pius Ng, Portland, OR (US); Dushyanth Gokhale, Bengaluru (IN)

(73) Assignee: DIMAAG-AI, Inc., Fremont, CA (US)

( * ) Notice: Subject to any disclaimer, the term of this patent is extended or adjusted under 35 U.S.C. 154(b) by 571 days.

(21) Appl. No.: 18/345,250

(22) Filed: Jun. 30, 2023

(65) Prior Publication Data

US 2024/0027974 A1 Jan. 25, 2024

Related U.S. Application Data

(63) Continuation-in-part of application No. 17/814,682, filed on Jul. 25, 2022, now abandoned.

(51) Int. Cl.
*G05B 13/02* (2006.01)

(52) U.S. Cl.
CPC ......... *G05B 13/026* (2013.01); *G05B 13/024* (2013.01)

(58) Field of Classification Search
CPC ... G05B 13/026; G05B 13/024; G05B 13/048
See application file for complete search history.

(56) References Cited

U.S. PATENT DOCUMENTS 8,005,771 B2 8/2011 Chen et al.
11,295,241 B1 4/2022 Badawy et al.
11,527,155 B2 * 12/2022 Huang ................. G08G 1/0145
2006/0074828 A1 4/2006 Heumann et al.
2007/0073511 A1 * 3/2007 Saito ................... G01D 18/001 702/145
2011/0078302 A1 * 3/2011 Dehaan ............... H04L 41/0631 709/224
2013/0173215 A1 * 7/2013 Patankar ........... G05B 23/0232 702/179
2016/0181967 A1 * 6/2016 Nojima .................. H02P 31/00 700/286

(Continued)

OTHER PUBLICATIONS

U.S. Appl. No. 17/814,682, Final Office Action mailed Jan. 13, 2023, 15 pgs.

(Continued)

*Primary Examiner* — Santosh R Poudel
(74) *Attorney, Agent, or Firm* — Polygon IP, LLP

(57) ABSTRACT

A first plurality of predictor values occurring during or before a first time interval may be received. An estimated outcome value may be determined for a second time interval by applying a prediction model via a processor to the first plurality of predictor values. A designated outcome value occurring during the second time interval and a second plurality of predictor values occurring during or before the second time interval may be received. An error value may be determined based on the estimated outcome value and the designated outcome value. A drift value for a second time interval may be determined by fitting a function to the second plurality of predictor values. The prediction model may be updated when it is determined that the drift value exceeds a designated drift threshold or that the error value exceeds a designated error threshold.

16 Claims, 7 Drawing Sheets

(56) References Cited

U.S. PATENT DOCUMENTS

| | | | | |
|---|---|---|---|---|
| 2016/0201934 | A1* | 7/2016 | Hester | F24F 11/89 700/276 |
| 2019/0145233 | A1* | 5/2019 | Karale | G01V 20/00 702/6 |
| 2020/0091017 | A1 | 3/2020 | Musselman | |
| 2021/0365793 | A1 | 11/2021 | Surya et al. | |
| 2022/0165292 | A1 | 5/2022 | Saki et al. | |
| 2022/0227397 | A1* | 7/2022 | Jiang | G06F 11/3013 |
| 2022/0292340 | A1 | 9/2022 | Gogoglou et al. | |
| 2022/0414534 | A1* | 12/2022 | Ananthanarayanan | G06N 3/09 |

OTHER PUBLICATIONS

U.S. Appl. No. 17/814,682, Non Final Office Action mailed Sep. 22, 2022, 12 pgs.

U.S. Appl. No. 17/814,684, Final Office Action mailed Mar. 13, 2023, 21 pgs.

U.S. Appl. No. 17/814,684, Non Final Office Action mailed Nov. 8, 2022, 21 pgs.

Cavalcante et al. (FEDD: Feature Extraction for Explicit Concept Drift Detection in Time Series, Jul. 2016, pp. 7 40-7 47) (Year:2016).

Gunther et al. (Intelligent laser welding through representation, prediction, and control learning: An architecture with deep neuralnetworks and reinforcement learning, Oct. 2015, pp. 1-11) (Year: 2015).

Killick et al., "Optimal detection of changepoints with a linear computational cost", 2012, Journal of the American Statistical Association 107.500, pp. 1590-1598.

Lu et al. (Learning under Concept Drift: A Review, Dec. 2019, pp. 2346-2363) (Year: 2019).

Mowbray et al. (Using process data to generate an optimal control policy via apprenticeship and reinforcement learning, Apr. 2021,pp. 1-15) (Year: 2021).

Plotnikov et al., "Estimation of the statistical error and the choice of parameters in the method of test particles", 2012, Russ. J. Numer. Anal. Math. Modelling 27.2, pp. 155-173.

Silva et al., "A branch-and-bound inspired technique to improve the computational efficiency of DOA estimation", 2013, Signal processing 93.4, pp. 947-956.

* cited by examiner

DRIFT DETECTION IN DYNAMIC PROCESSES

CROSS-REFERENCE TO RELATED APPLICATIONS

This application is a continuation-in-part of, and claims priority to, U.S. patent application Ser. No. 17/814,682, titled "DRIFT DETECTION IN DYNAMIC PROCESSES", filed Jul. 25, 2022 by Kudli et al., which is hereby incorporated by reference in its entirety and for all purposes.

FIELD OF TECHNOLOGY

This patent document relates generally to machine learning and more specifically to the prediction of dynamic time-series data.

BACKGROUND

Machine learning is commonly used to predict data values. For instance, a prediction model is trained using a set of predictor values and corresponding observed outcome values. Such training often involves comparing predicted outcome values against observed outcome values to determine one or more error terms and then adjusting one or more model parameters to reduce the one or more error terms.

One type of data used to train prediction models is time-series data. In time-series data, both predictor values and outcome values are observed at particular points or intervals in time. A prediction model trained on such a sequence of data may then be used to predict outcomes that have not yet occurred. In such a process, an outcome value observed in the past may be included as a predictor value for predicting an outcome value that occurs in the future.

Such techniques have many applications. As only one example of many, a set of predictor values observed for a battery within an electric vehicle may be used to predict the future performance or failure of the battery. Because of the wide-ranging importance of prediction models for time-series data, improved techniques for implementing such models are desired.

Overview

According to various embodiments, systems, apparatus, methods and computer program products described herein facilitate the detection of drift in dynamic processes. In some implementations, A first plurality of predictor values occurring during or before a first time interval may be received. An estimated outcome value may be determined for a second time interval by applying a prediction model via a processor to the first plurality of predictor values. A designated outcome value occurring during the second time interval and a second plurality of predictor values occurring during or before the second time interval may be received. An error value may be determined based on the estimated outcome value and the designated outcome value. A drift value for a second time interval may be determined by fitting a function to the second plurality of predictor values. The prediction model may be updated when it is determined that the drift value exceeds a designated drift threshold or that the error value exceeds a designated error threshold.

In some embodiments, the function may be a polynomial function, which may be a third-order polynomial function. Alternatively, or additionally, determining the drift value for the second time interval includes determining one or more derivatives of the function. Determining the drift value for the second time interval may include determining a first derivative, a second derivative, and a third derivative of the function.

In some implementations, the second plurality of predictor values may include the designated outcome value. The first plurality of predictor values may include a first vector of variables observed during the first time interval. The second plurality of predictor values may include a second vector of variables observed during the second time interval.

In some embodiments, the estimated outcome value for the second time interval may be determined by applying the prediction model to the first vector of variables and the second vector of variables. The drift value may be determined by fitting the function to both the first vector of variables and the second vector of variables.

BRIEF DESCRIPTION OF THE DRAWINGS

The included drawings are for illustrative purposes and serve only to provide examples of possible structures and operations for the disclosed inventive systems, apparatus, methods and computer program products for detecting drift in dynamic process. These drawings in no way limit any changes in form and detail that may be made by one skilled in the art without departing from the spirit and scope of the disclosed implementations.

DETAILED DESCRIPTION

Figure 1:
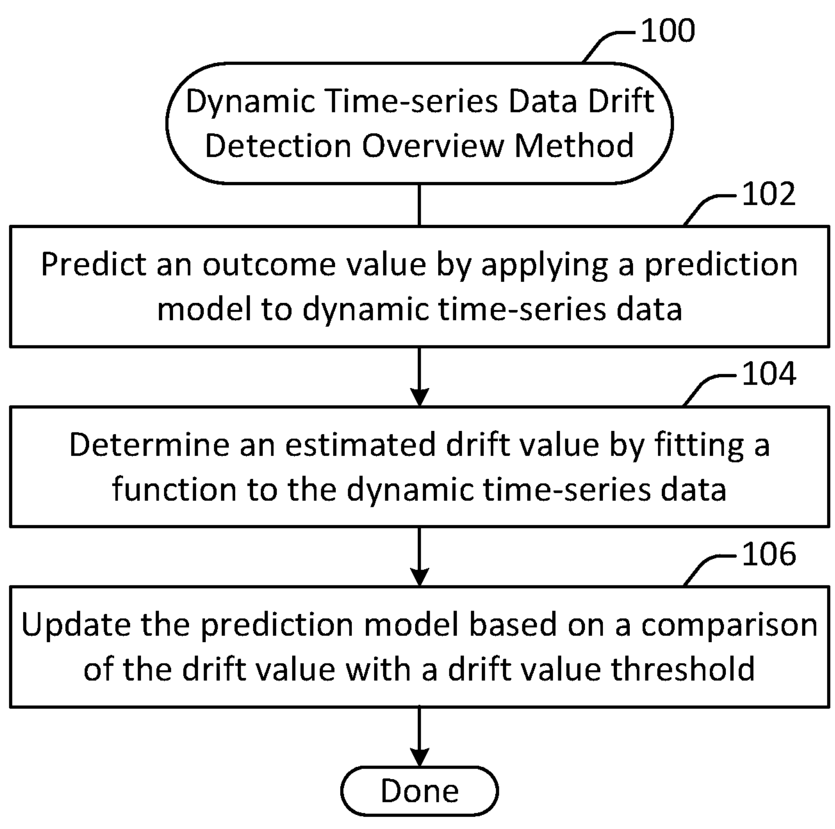
FIG. 1 illustrates an example of an overview method for drift detection in dynamic time-series data, performed in accordance with one or more embodiments.

According to various embodiments, techniques and mechanisms described herein relate to the prediction of dynamic time-series data. A prediction model is applied to one or more predictor values to predict an outcome of interest that has not yet been observed. The prediction model can be updated when the observed values associated with the outcome of interest suggest that the outcome of interest is drifting over time from one state to another. By updating the model when drift is detected rather than at every time series interval, the predictive accuracy of the model may be maintained while saving significant computational cost.

According to various embodiments, time-series data refers to data that is observed in accordance with a temporal sequence. For example, the temperature in a given location may be observed once per day, hour, minute, second, or some other interval of time. In some configurations, time-series data may involve observation of data at regular intervals, such as once per second. Alternatively, time-series data may involve observation of data at irregular intervals.

In some implementations, a prediction model may be used to predict future outcomes of time-series data that have not yet been observed. For instance, prediction models are commonly used to predict variables such as the weather temperature, battery levels, machine performance, or other such observable states.

According to various embodiments, a prediction model may take as input one or more predictor values that were observed in the past. Predictor values may include past observations of the outcome variable. For example, a prediction of tomorrow's temperature may depend in part on the temperature observed today. Alternatively, or additionally, predictor values may include past observations of other variables. For example, a prediction of tomorrow's temperature may depend in part on barometric pressure observed today.

In some implementations, a prediction model may need to be periodically updated to account for changes in the data generating process, particularly for dynamic data. Dynamic data refers to data that tends to exhibit short-term serial correlation coupled with shifts between states over time. For example, a sequence of observations of weather temperature that are much higher than normal may indicate the presence of a "heat wave" that is likely to persist into the near future. In such a situation, a predictive model that only takes into account long term average temperatures is likely to be less accurate in predicting tomorrow's temperature than a predictive model updated to account for the recent trend.

According to various embodiments, one approach to updating a predictive model for time-series data is to update the model at each time period, when new time-series data is observed. However, particularly for models that receive data at a rapid pace, such as once per second, such an approach may be prohibitively computationally expensive.

According to various embodiments, another approach to updating a predictive model for time-series data is to update the predictive model when the model's predictions are seen to significantly deviate from observed values. However, such an approach requires waiting until the observed values are actually observed, by which time the predictive model may have already been used to determine one or more highly inaccurate predictions.

Thus, prediction models are limited in efficacy by the data used in their construction. For example, consider a prediction model trained to predict the failure of bearings in mechanical machines. In such a context, failure indicators such as noise and smoke may occur only immediately before the failure event, while failure indicators such as changes in heat and pressure may occur further in advance. However, the earliest indicator of incipient failure may be vibration detected vibration sensors. Nevertheless, the use of vibration data to predict machine failure or other types of states associated with a mechanical process may be limited by the way in which a machine changes over time. For example, a machine may degrade over time, causing the data values to drift.

For the purpose of exposition, various techniques are described herein with reference to a particular example of a machine learning prediction problem in which machine vibration data is used to predict bearing failure. However, various embodiments of techniques and mechanisms described herein are broadly applicable to a range of contexts. For example, techniques and mechanisms described herein may be used to predict machine failure in a variety of contexts based on a variety of input data, such as data from various sensors of various types associated with mechanical machines or machine components. As another example, techniques and mechanisms described herein may be used to predict any type of outcome for which production data observed in deployment may at least occasionally differ considerably from patterns observable in data used to train the machine learning prediction model.

In particular embodiments, a variety of types of data may be included in a training data observation. For example, a given training data observation may include data on physical dimensions that define the configuration or operating conditions of the system that gave rise to the feature values, such as bearing speed, bearing load, bearing size, ambient temperature, and/or other types of metadata. As another example, in the context of bearing failure, values from the power spectrum of a vibration signal detected by a sensor may be used to train and apply the prediction model.

According to various embodiments, techniques and mechanisms described herein provide for an approach to updated predictive models based on drift in the observed outcome values. Drift may be detected by fitting a function to the observed outcome values to determine one or more fitted function parameters. The fitted function parameters may then be analyzed to identify one or more indicates of drift in the observed outcome values. When the drift exceeds a designated threshold, the predictive model may be updated to account for the drift.

According to various embodiments, in this way the predictive model may be updated to produce estimates with greater accuracy in some configurations than would be the case if the model were not updated until prediction errors were detected. At the same time, computational cost is saved by virtue of not updating the model too frequently. Accordingly, the machine on which the predictive model is implemented may exhibit significantly improved performance without significantly inhibiting the performance of the predictive model.

FIG. 1 illustrates an example of an overview method 100 for drift detection in dynamic time-series data, performed in accordance with one or more embodiments. According to various embodiments, the method 100 may be performed in any suitable computing device as part of the implementation of a machine learning procedure for predicting outcomes in dynamic time-series data. Additional details regarding the nature of time-series data are discussed with respect to the diagram 500 shown in FIG. 5.

An outcome value is predicted at 102 by applying a prediction model to dynamic time-series data. According to various embodiments, any suitable prediction model may be used. Examples of suitable prediction models may include, but are not limited to: autoregression models, moving average models, exponential smoothing models, other types of models, or some combination thereof. The prediction model may be trained over time on the dynamic time-series data. Additional details regarding the prediction of dynamic time-series data are discussed with respect to the method 200 shown in FIG. 2. An example of a plot of observed and predicted dynamic time-series outcome values analyzed and determined in accordance with techniques and mechanisms described herein is shown in the plot 300 in FIG. 3.

An estimated drift value is determined at 104 by fitting a function to the dynamic time-series data. In some implementations, the drift value may indicate an extent to which the observed outcome values are trending over time. The drift value may be determined by first determining one or more parameters based on fitting the function to the dynamic time-series data and then separately determining the drift value as a function of those parameters. Additional details regarding the determination of an estimated drift value are discussed with respect to the method 400 shown in FIG. 4.

The prediction model is updated at 106 based on a comparison of the drift value with a drift value threshold. According to various embodiments, the comparison may involve determining whether the drift value exceeds the threshold. Selecting a drift value threshold may involve making a tradeoff between computational workload and model prediction accuracy. For instance, setting a lower drift value threshold may lead to more frequent model training, which may yield improved model prediction accuracy at the expense of greater computational workload. Additional details regarding the tradeoff between drift value threshold and model accuracy are discussed with respect to the plot 300 shown in FIG. 3.

Figure 2:
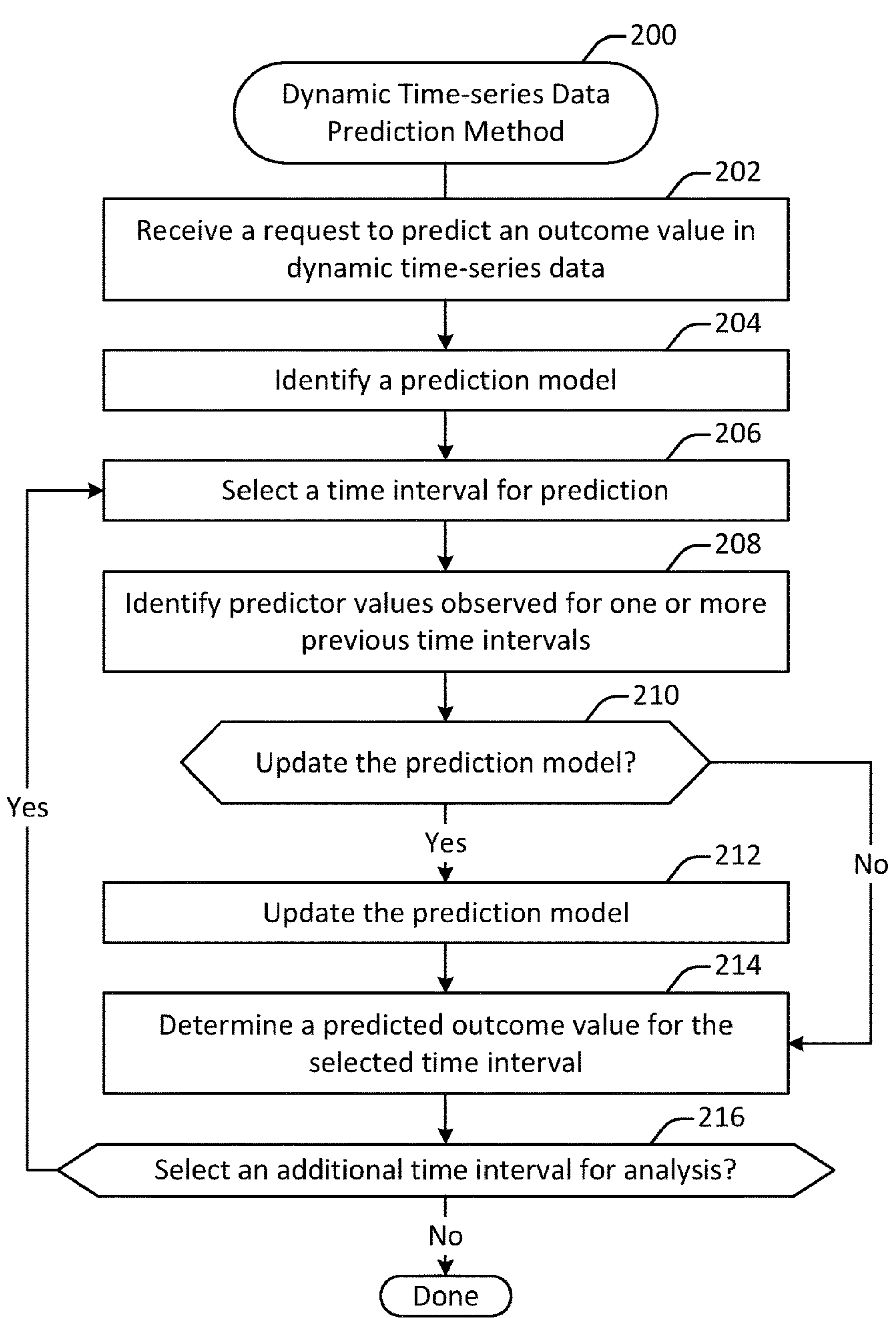
FIG. 2 illustrates an example of a method for predicting dynamic time-series data, performed in accordance with one or more embodiments.

FIG. 2 illustrates an example of a method 200 for predicting dynamic time-series data, performed in accordance with one or more embodiments. According to various embodiments, the method 200 may be performed in any suitable computing device as part of the implementation of a machine learning procedure for predicting outcomes in dynamic time-series data. Additional details regarding the nature of time-series data are discussed with respect to the diagram 500 shown in FIG. 5.

A request to predict an outcome value in dynamic time-series data is received at 202. According to various embodiments, the request may be generated automatically or manually. Any suitable time-series data may be analyzed. For example, time-series data may include data output by a physical process such as a production process. For instance, a machine may periodically output information such as temperature or pressure when performing a mechanical operation. As another example, time-series data may include data output by an economic process. For instance, currency exchange data may be periodically retrieved from a financial exchange. As yet another example, time-series data may include data output by an environmental process. For instance, time-series data may include weather data periodically observed at one or more sensors. As still another example, time-series data may include sensor data output by a device. For instance, a battery system or elective vehicle charging system may provide periodic sensor readings indicating a state or condition associated with the condition.

A prediction model is identified at 204. According to various embodiments, any suitable prediction model may be used. Such models may include, but are not limited to regression models, autoregressive models, integrated models, moving average models, other types of models, and/or ensemble models that include elements of different models.

A time interval is selected for prediction at 206. According to various embodiments, any of various criteria may be used for selecting a time interval for prediction. For example, the next available time interval for which outcome data has not yet been observed may be selected. In this way, the predictive model may be used to predict a future outcome value.

In some embodiments, historical data may be analyzed, for instance for the purpose of tuning the model. Such an approach may allow the empirical determination of a parameter such as a drift threshold value based on, for instance, a tradeoff between computational efficiency and model accuracy. For example, a desired level of model accuracy may be specified, and the drift threshold value may then be determined based on finding a maximum drift threshold value for the desired level of model accuracy over a period of time.

One or more predictor values observed for one or more previous time intervals are identified at 208. According to various embodiments, dynamic time-series data may have various numbers and types of data collected in a given time interval. For example, at a minimum a dataset including dynamic time-series data may include only an outcome variable that is observed at different points in time, where future values of the outcome variable are predicted entirely based on past values of the outcome variable. As another example, dynamic time-series data may include a vector multiple outcome variables that are periodically observed and then collectively predicted based on their past values. As yet another example, dynamic time-series data may include a vector of one or more outcome variables as well as a vector of one or more predictor values that are periodically observed. In this case, future outcome values may be predicted based on some combination of past outcome values and other predictor values. Accordingly, the one or more predictor values observed at 208 for one or more previous time intervals may include one or more of previously-observed outcome values and other predictor values apart from outcome values.

A determination is made at 210 as to whether to update the prediction model. According to various embodiments, the determination may be made based at least in part on an analysis of one or more drift parameters calculated based on the observed data. Alternatively, or additionally, the determination may be made based at least in part on the observed accuracy of previous predictions by the prediction model. Additional details regarding how to determine whether to update the prediction model are discussed with respect to the method 400 shown in FIG. 4.

If it is determined to update the prediction model, then the prediction model is updated at 212. According to various embodiments, the precise operations used to update the prediction model depend on the type of prediction model being employed. However, as a general matter, the prediction model may be updated to reflect the additional data that has been observed since the prediction model was most recently updated. In this way, the prediction model may be updated to improve the accuracy of the resulting predictions to account for drift detected as discussed with respect to the method 400 shown in FIG. 4.

A predicted outcome value is determined for the selected time interval at 214. In some implementations, the predicted outcome value may be determined by applying the prediction model identified at 204 to the predictor values identified at 208. Alternatively, if the prediction model has already been updated at 212, then the updated prediction model may be employed instead.

A determination is made at 216 as to whether to select an additional time interval for analysis. According to various embodiments, additional time intervals may be selected continuously, or until a terminating condition is met.

Figure 3:
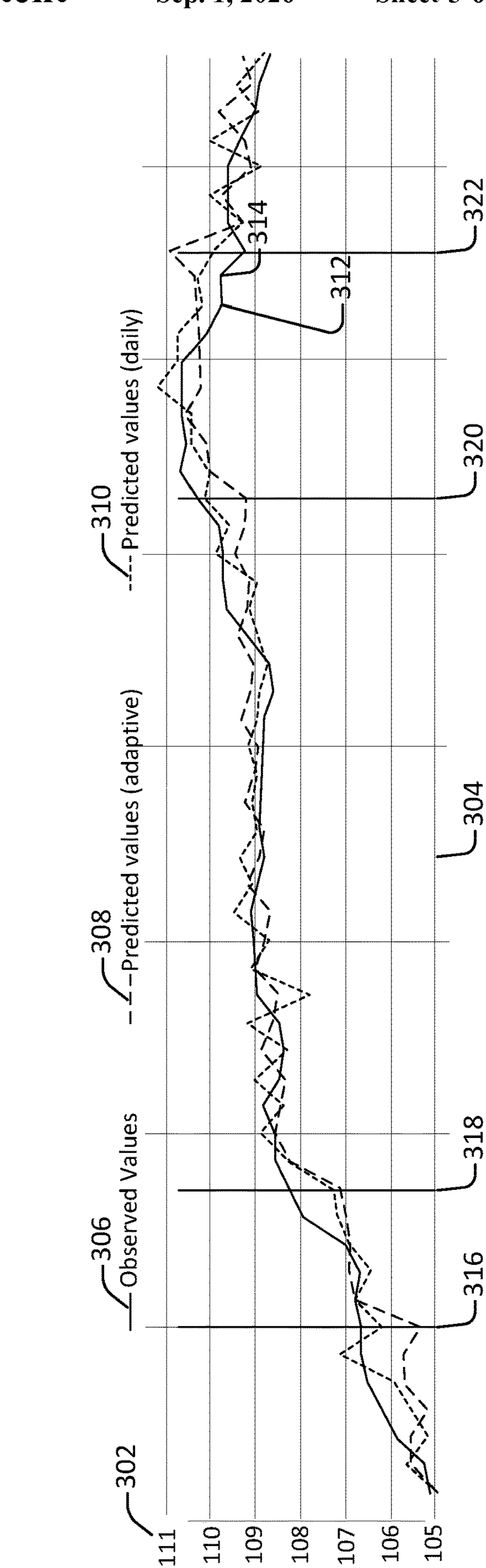
FIG. 3 illustrates an example of a plot of actual and predicted dynamic time-series data values, generated in accordance with one or more embodiments.

FIG. 3 illustrates an example of a plot 300 of actual and predicted dynamic time-series data values, generated in accordance with one or more embodiments. In the plot 300, the y-axis 302 represents a scale of outcome values, while the x-axis 304 represents a sequence of time values.

For the purpose of exposition, the outcomes are assumed to be observed on a daily basis. Accordingly, every inflection point on the graph represents a daily observation. For example, the point 312 represents a data value observed on one day, while the point 314 represents a data value observed on the following day.

Each plotted line represents a different sequence of outcome values over time. The observed outcome values 306 represent the values of the outcome variable that were actually observed. The daily predicted outcome values 310 represent outcome values determined based on a prediction model that is updated daily. The adaptive predicted outcome values 308 represent outcome values determined based on a prediction model that is updated less frequently.

The plot 300 shows that the daily predicted outcome values 310 closely match the observed outcome values 306. However, despite being produced by a prediction model updated far less frequently than the prediction model used to determine the daily predicted outcome values 310, the adaptive predicted outcome values 308 match the actual predicted outcome values 306 nearly as well as the daily predicted outcome values 310.

In FIG. 3, the vertical bars 316, 318, 320, and 322 indicate points in time at which the prediction model used to determine the adaptive predicted outcome values 308 were updated. The vertical bars 316, 318, 320, and 322 correspond with points in time at which the observed outcome values 316 exhibit drift from the pattern of observed outcome values in the immediate past.

Figure 4:
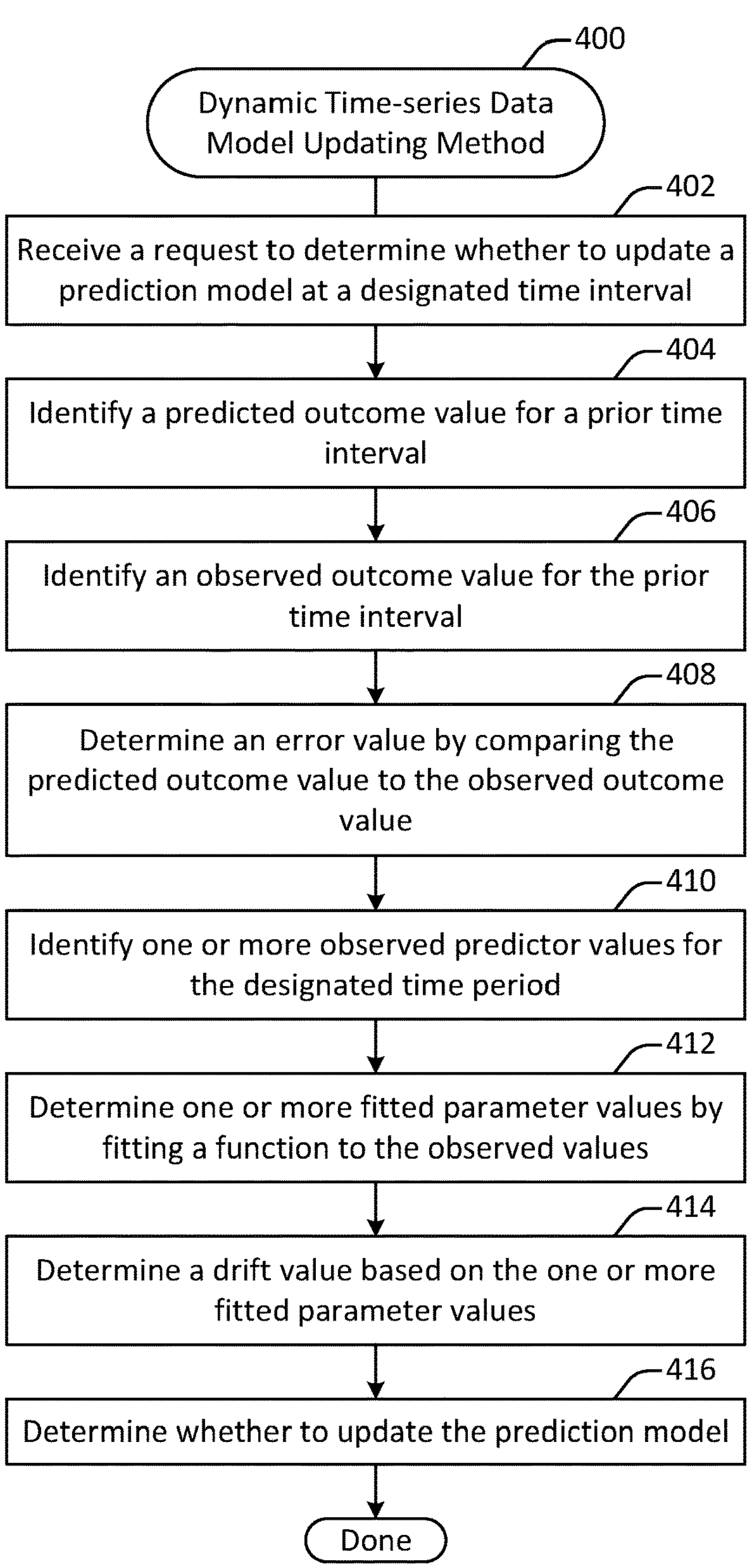
FIG. 4 illustrates an example of a method for determining whether to update a data model for predicting dynamic time-series data values, performed in accordance with one or more embodiments.

FIG. 4 illustrates an example of a method 400 for determining whether to update a data model for predicting dynamic time-series data values, performed in accordance with one or more embodiments. According to various embodiments, the method 400 may be performed in any suitable computing device as part of the implementation of a machine learning procedure for predicting outcomes in dynamic time-series data.

Figure 5:
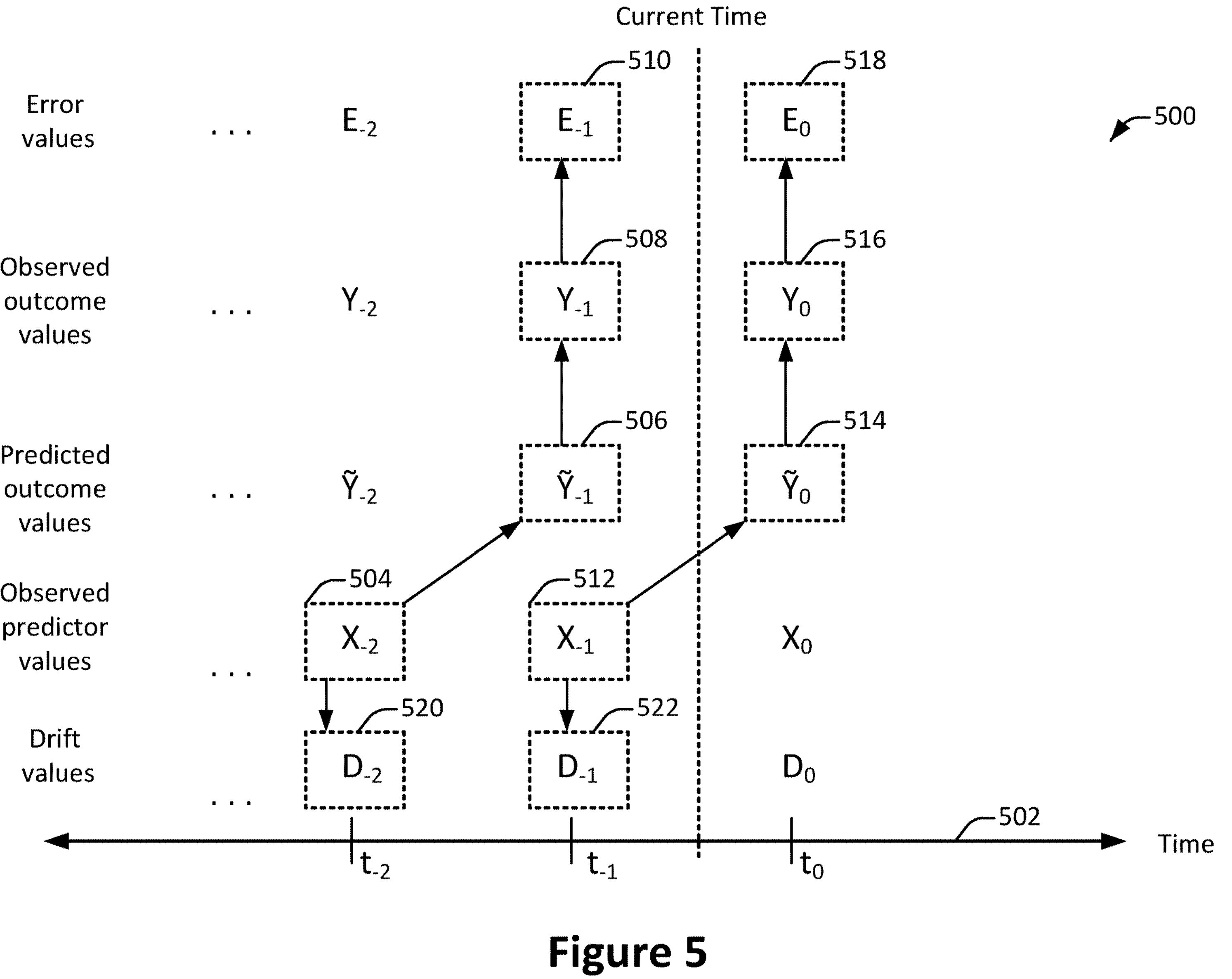
FIG. 5 illustrates an example of a diagram for illustrating observed and predicted dynamic time-series data values, generated in accordance with one or more embodiments.

FIG. 4 is described partially in reference to FIG. 5, which illustrates an example of a diagram 500 for illustrating observed and predicted dynamic time-series data values, generated in accordance with one or more embodiments. The diagram 500 shows a timeline arranged along a time axis 502. Displayed along the timeline are observed predictor values $X_{-2}$ 504 and $X_{-1}$ 512, predicted outcome values $\tilde{Y}_{-1}$ 506 and $\tilde{Y}_0$ 514, observed outcome values $Y_{-1}$ 508 and $Y_0$ 516, error values $E_1$ 510 and $E_0$ 518, and drift values $D_{-2}$ 520 and $D_{-1}$ 522.

According to various embodiments, the observed outcome values referenced in FIG. 4 may be identified in any of variety of ways. For example, one or more outcome values may be detected by a sensor attached to a computing device. As another example, one or more outcome values may be received from a user input device. As yet another example, one or more outcome values may be received via a network from a remote communication device. For instance, outcome values may be transmitted over a local network or the internet.

Returning to FIG. 4, a request is received at 402 to determine whether to update a prediction model at a designated time interval. According to various embodiments, the request may be generated as described with respect to the operation 210 shown in FIG. 2. That is, as part of the prediction process, a determination may be made as to whether to update the prediction model.

A predicted outcome value for a prior time interval is identified at 404. At 406, an observed outcome value for the prior time interval is determined. According to various embodiments, the predicted outcome value for a prior time interval may have been determined at operation 214 at some time in the past, when the observed outcome value determined at 406 was not yet available.

An error value is determined at 408 by comparing the predicted outcome value to the observed outcome value. According to various embodiments, the error value may be determined in any of a variety of ways. For example, the error value may be calculated as a mean absolute error, a root mean square error, a weighted root mean square error, or any other suitable error value.

As a graphical example of operations 404-408, during or before a time interval $t_2$, one or more predictor values $W_{-2}$ 504 are observed. According to various embodiments, the predictor values $X_{-2}$ 504 may include any information available as of time $t_{-2}$. For example, the predictor values $X_{-2}$ 504 may include one or more observed outcome values $Y_{-2}$ 504. As another example, the predictor values $X_{-2}$ 504 may include may include one or more outcome values observed in the past, prior to time $t_{-2}$. As yet another example, the predictor values $X_{-2}$ 504 may include may include non-outcome values observed at time $t_{-2}$ and/or at a time prior to time $t_2$.

According to various embodiments, the predictor values $X_{-2}$ 504 may be used to determine a predicted outcome value $\tilde{Y}_{-1}$ 506, which is a prediction of the actual outcome value $Y_{-1}$ 508 that has not yet been observed as of time $t_{-2}$. As of time $t_{-1}$, the actual outcome value $Y_{-1}$ 508 is observed. At that point, the predicted outcome value $\tilde{Y}_{-1}$ 506 may be compared with the actual outcome value $Y_{-1}$ 508 to determine an error value $E_{-1}$ 510. If the error value is excessive, then a determination may be made to update the model.

One or more predictor values for the designated time period are identified at 410. According to various embodiments, the predictor outcome values referenced in FIG. 4 may be identified in any of variety of ways. For example, one or more predictor values may be detected by a sensor attached to a computing device. As another example, one or more predictor values may be received from a user input device. As yet another example, one or more predictor values may be received via a network from a remote communication device. For instance, predictor values may be transmitted over a local network or the internet.

One or more fitted parameter values are determined at 412 by fitting a function to the observed values. According to various embodiments, any of a variety of functional forms may be used. For example, a third-degree polynomial function of the form $y=at^3+bt^2+ct+d$ may be used. As another example, a polynomial of a different degree or form may be used. As yet another example, for data known to be periodic, a sinusoidal functional form may be used.

According to various embodiments, the fitted parameter values that are determined depend on the type of function fitted to the data. For example, in the case of a third-degree polynomial function of the form $y=at^3+bt^2+ct+d$, the fitted parameters may include the values a, b, c, and d.

In some implementations, the observed values used to fit the function may include any or all of the observed predictor values. For example, in FIG. 5, at time $t_{-1}$ the observed predictor values $X_{-1}$ may be used to fit the function. As discussed herein, the observed predictor values $X_{-1}$ may include any previously observed outcome values or any other suitable predictors that have already been observed.

According to various embodiments, by fitting a function to observed predictor values, a determination may be made to update the model when drift is detected, and potentially before the prediction model predicts values that are erroneous by an unacceptable degree. For instance, at time $t_{-1}$, the observed predictor values $X_{-1}$ may be used to predict the predicted outcome value $\tilde{Y}_0$ 508. However, because the observed outcome value $Y_0$ 510 has not yet been observed as of time $t_{-1}$, the resulting prediction cannot be used to determine whether to update the model until a later time (i.e., time $t_0$) when the outcome value $Y_0$ 510 is actually observed. In contrast, because the predictor values $X_{-1}$ are observed as of time $t_0$, determining a drift value $D_{-1}$ 522 based on the predictor values $X_{-1}$ allows the system to update the model at an earlier stage (i.e., time $t_{-1}$), in advance of observing the outcome value $Y_0$ 510.

As a more concrete example, suppose that the time-series data exhibits a sudden change in observed predictors around the time $t_{-1}$. Unless the predictive model is updated, the change will result in a substantially erroneous prediction at time $t_0$. However, when using conventional techniques, the error can only be addressed after it has occurred, when the outcome value $Y_0$ 510 is observed at time $t_0$ and the error value $E_0$ 518 has been determined. In contrast, when using techniques and mechanisms described herein, the change can be detected at an earlier time $t_{-1}$, by detecting drift $D_{-1}$ in the predictor values $X_{-1}$ that are observed at time $t_{-1}$. In this way, the predictive model can be updated in time period $t_{-1}$ rather than at time $t_0$, and a more accurate prediction can be issued for time $t_0$.

In some implementations, fitting the model may involve selecting a window of data on which to fit the model. The window may specify, for instance, some number of time intervals in the past for which to use data for model fitting. The length of the window may be empirically determined by model tuning. For instance, the window length may be strategically determined based on desired outcomes such as prediction accuracy and computational efficiency.

In some embodiments, fitting the model may involve applying any suitable numerical solver tool. For instance, the SciPy library may be used to fit a function to data using a nonlinear least squares approach.

A drift value is determined at 414 based on the one or more fitted parameter values. According to various embodiments, various types of drift value calculations are possible. For example, in the case of the third-degree polynomial function of the form $y=at^3+bt^2+ct+d$, one or more of the first derivative ($y'=3at^2+2bt+c$), the second derivative ($y''=bat+2b$), and the third derivative ($y'''=6a$) may be calculated. Then, a drift value may be calculated as, for instance, a unified derivative of n-features, as shown in the following equation:

$$3D_nF = \sqrt{\sum_{i=1}^{n} (3D_i)^2}$$

A determination is made at 416 as to whether to update the prediction model. According to various embodiments, the determination may involve comparing the drift value determined at 414 with a threshold drift value. Alternatively, or additionally, the determination may involve comparing the error value determined at 408 with a threshold error value. As one example, the prediction model may be updated if either the drift value determined at 414 exceeds a threshold drift value or the error value determined at 408 exceeds a threshold error value.

According to various embodiments, although the method 400 refers to a single error value and a single drift value for the purpose of exposition, in some implementations more than one error value, drift value, error threshold, and/or drift threshold may be employed. In this way, the system may be flexibly tuned to detect different types of drift and errors. For instance, rather than determining a single drift value based on the first, second, and third derivative, different drift values may instead be determined for different derivatives. In such a situation, the detection of any drift value that exceeds a designated threshold may be sufficient to cause the prediction model to be updated. Alternatively, some combination of drift values that exceed a designated threshold may result in the prediction model being updated.

According to various embodiments, operations shown in the method 400 in FIG. 4, or indeed in any method discussed herein, may be performed in an order different than that shown. For example, one or more operations may be performed in parallel, or in a different sequence than presented in the figures.

Figure 6:
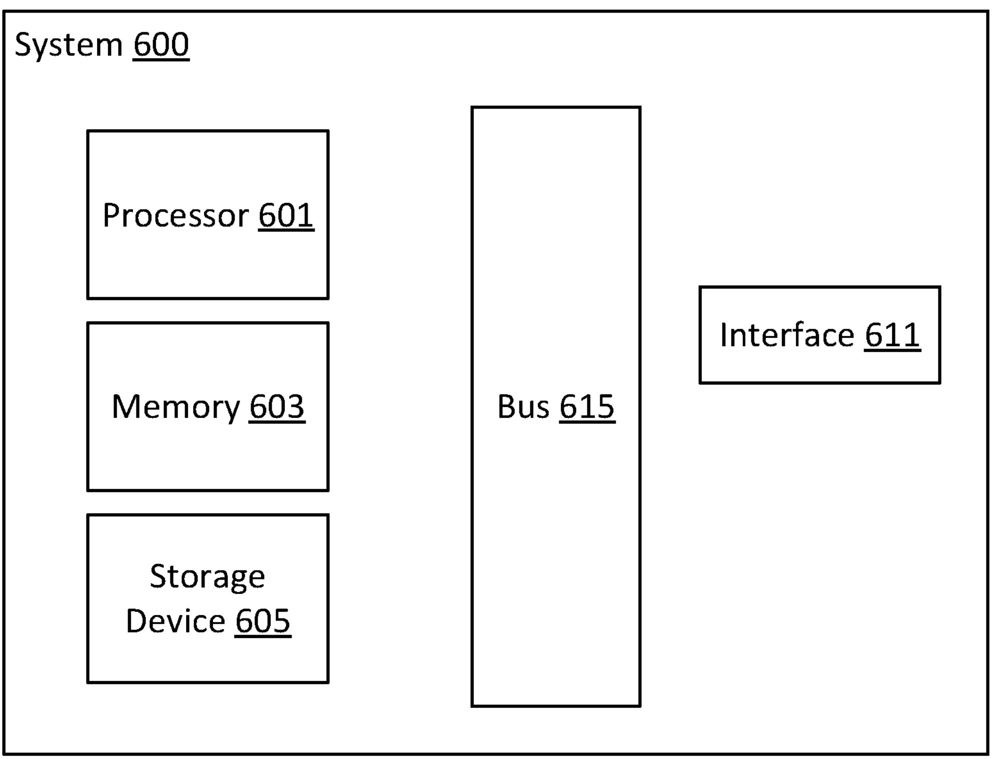
FIG. 6 illustrates one example of a computing device, configured in accordance with one or more embodiments.

FIG. 6 illustrates one example of a computing device. According to various embodiments, a system 600 suitable for implementing embodiments described herein includes a processor 601, a memory module 603, a storage device 605, an interface 611, and a bus 615 (e.g., a PCI bus or other interconnection fabric.) System 600 may operate as variety of devices such as an application server, a database server, or any other device or service described herein. Although a particular configuration is described, a variety of alternative configurations are possible. The processor 601 may perform operations such as implementing a prediction model, performing drift detection, and/or updating a prediction model. Instructions for performing such operations may be embodied in the memory 603, on one or more non-transitory computer readable media, or on some other storage device. Various specially configured devices can also be used in place of or in addition to the processor 601. The interface 611 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user. In some embodiments, the computing device 600 may be implemented in a cloud computing environment.

Figure 7:
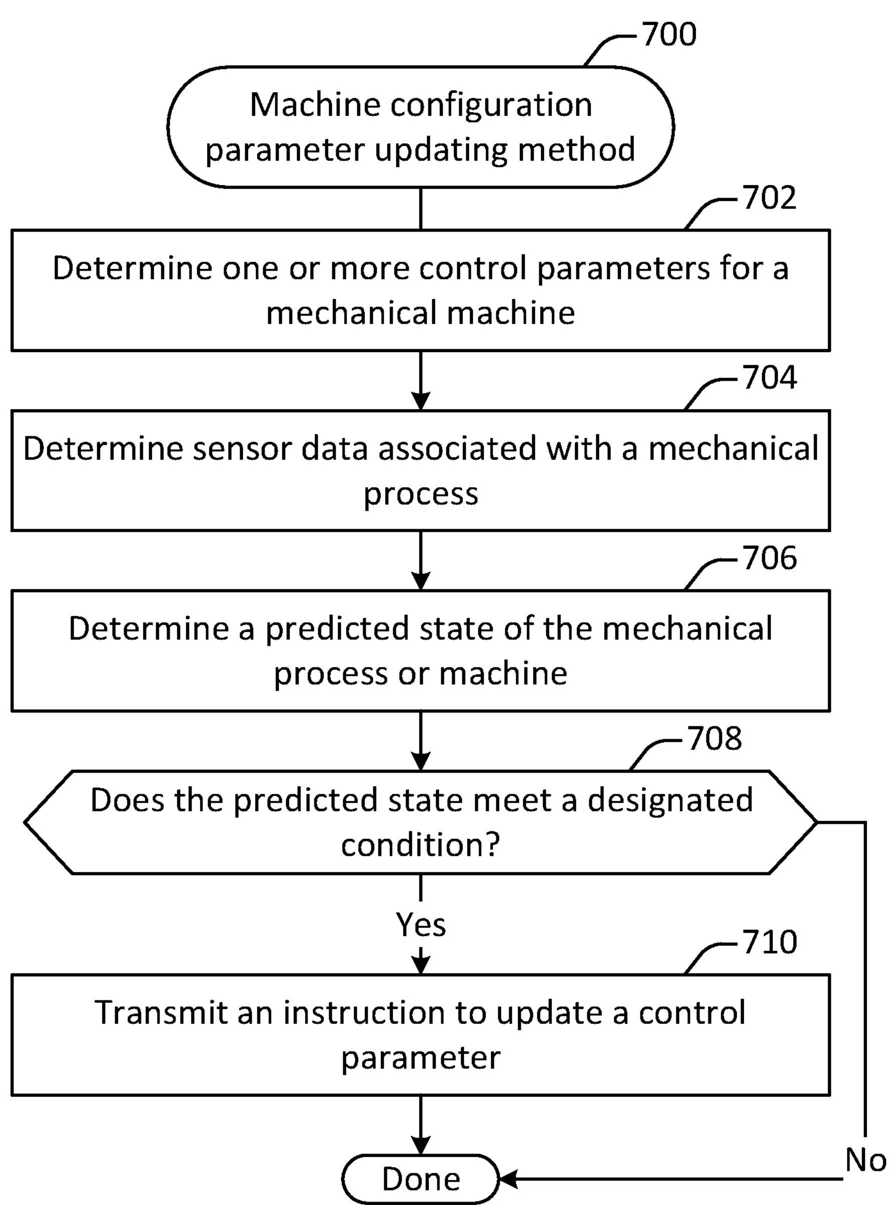
FIG. 7 illustrates a method for updating a machine configuration parameter, performed in accordance with one or more embodiments.

FIG. 7 illustrates a method 700 of updating a machine configuration parameter, performed in accordance with one or more embodiments. According to various embodiments, the method 700 may be performed at any suitable computing device. For example, the method 700 may be implemented at a hardware controller for one or more mechanical components. As another example, the method 700 may be implemented at least in part at another type of computing device in communication with one or more mechanical components, such as at a remote system in communication with a hardware controller controlling one or more mechanical components.

One or more control parameters associated with a mechanical machine are determined at 702. According to various embodiments, the particular types of control parameters that are determined at 702 may depend in part on the type of mechanical machine or process being monitored. For instance, a control parameter may indicate a speed, pressure, temperature, or other such setting associated with a mechanical machine. Such parameters may be specified by manually adjusting the mechanical machine. Alternatively, or additionally, one or more such parameters may be specified by a hardware and/or software controller configured to send operating instructions to the mechanical machine.

At 704, sensor data associated with a mechanical process is determined. In some embodiments, the sensor data may be collected from one or more sensors associated with a mechanical process. A sensor may collect information such as temperature, vibration, pressure, or other such values. Such information may be transmitted to a hardware controller, a remote computing device, and/or any other suitable recipient of the information.

At 706, a predicted state of the mechanical process or machine is determined. In some embodiments, the prediction may be determined by applying a prediction model to the one or more control parameters determined at 702, the sensor data determined at 704, and/or any other information. Additional details regarding the training and execution of prediction models for mechanical devices and processes are discussed throughout the application as filed.

According to various embodiments, any of a variety of different types of states may be predicted. For example, the state may be a failure condition for a mechanical component, such as a bearing, within a larger mechanical device. As another example, the state may be a failure mode for a mechanical device as a whole. A failure mode may be a machine failure such as a bearing failure or other type of mechanical failure. As another example, the state may be an outcome observable via a sensor such as a temperature, vibration, pressure, or other such value. As yet another example, the state may be an operating performance indicator such as a quality level for units produced by a mechanical process, a tolerance level for units produced by a mechanical process, a number of units processed in a period of time, or other such values.

A determination is made at 708 as to whether the predicted state meets a designated condition. According to various embodiments, the designated condition may vary based on the type of state being predicted and/or the type of machine or mechanical process being analyzed. For example, the designated condition may be the presence of a predicted failure mode for a machine or process. As another example, the designated condition may be a designated performance level such as a quality or tolerance level for units produced by a mechanical process. As yet another example, the designated condition may be an acceptable temperature, vibration, pressure, or other such value associated with a machine or mechanical process.

If it is determined that the predicted state meets the designated condition, then at 710 an instruction to update a control parameter is transmitted. According to various embodiments, the particular type of control parameter being updated and the manner in which it is updated depends on the type of machine or process being monitored and adjusted. For example, a setting such as temperature, pressure, or speed may be adjusted. As another example, a machine may be halted for inspection and maintenance. As yet another example, a message may be sent to a remote computing device identifying a machine or process for manual intervention.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A method comprising:

receiving via a communication interface a first plurality of predictor values occurring during or before a first time interval for a mechanical process;

determining an estimated outcome value for a second time interval by applying a prediction model via a processor to the first plurality of predictor values;

receiving via a communication interface a designated outcome value detected by a sensor and occurring during the second time interval and a second plurality of predictor values for the mechanical process occurring during or before the second time interval, the first time interval preceding the second time interval;

determining an error value via the processor based on the estimated outcome value and the designated outcome value;

determining a drift value for the second time interval by determining one or more derivatives of a polynomial function fitted to the second plurality of predictor values;

comparing the drift value to a designated drift threshold and comparing the error value to a designated error threshold;

retraining the prediction model when it is determined that the drift value exceeds the designated drift threshold;

storing the retrained prediction model on a storage device;

determining an estimated outcome value for the mechanical process based on the retrained prediction model; and halting the mechanical process based on the estimated outcome value meeting a designated condition.

2. The method recited in claim 1, wherein the polynomial function is a third-order polynomial function.

3. The method recited in claim 1, wherein determining the drift value for the second time interval includes determining a first derivative, a second derivative, and a third derivative of the function.

4. The method recited in claim 1, wherein the second plurality of predictor values includes the designated outcome value.

5. The method recited in claim 1, wherein the first plurality of predictor values includes a first vector of variables observed during the first time interval.

6. The method recited in claim 5, wherein the second plurality of predictor values includes a second vector of variables observed during the second time interval.

7. The method recited in claim 6, wherein the estimated outcome value for the second time interval is determined by applying the prediction model to the first vector of variables and the second vector of variables.

8. The method recited in claim 7, wherein the drift value is determined by fitting the function to both the first vector of variables and the second vector of variables.

9. A system comprising:

a communication interface configured to receive a first plurality of predictor values for a mechanical process occurring during or before a first time interval, a designated outcome value occurring during a second time interval, and a second plurality of predictor values for the mechanical process occurring during or before the second time interval, the first time interval preceding the second time interval;

a processor configured to determine a drift value for the second time interval by determining one or more derivatives of a polynomial function fitted to the second plurality of predictor values, to compare the drift value to a designated drift threshold, to compare the error value to a designated error threshold, and to retrain the prediction model when it is determined that the drift value exceeds the designated drift threshold; and a storage device configured to store the retrained prediction model, wherein an estimated outcome value is determined based on the retrained prediction model, wherein the communication interface is further configured to halt the mechanical process based on the estimated outcome value meeting a designated condition.

10. The system recited in claim 9, wherein the polynomial function is a third-order polynomial function.

11. The system recited in claim 9, wherein determining the drift value for the second time interval includes determining a first derivative, a second derivative, and a third derivative of the function.

12. The system recited in claim 9, wherein the second plurality of predictor values includes the designated outcome value.

13. The system recited in claim 9, wherein the first plurality of predictor values includes a first vector of variables observed during the first time interval, and wherein the second plurality of predictor values includes a second vector of variables observed during the second time interval.

14. The system recited in claim 13, wherein the estimated outcome value for the second time interval is determined by applying the prediction model to the first vector of variables and the second vector of variables.

15. The system recited in claim 14, wherein the drift value is determined by fitting the function to both the first vector of variables and the second vector of variables.

16. One or more non-transitory computer readable media having instructions stored thereon for performing a method, the method comprising:

receiving via a communication interface a first plurality of predictor values occurring during or before a first time interval for a mechanical process;

determining an estimated outcome value for a second time interval by applying a prediction model via a processor to the first plurality of predictor values;

receiving via a communication interface a designated outcome value detected by a sensor and occurring during the second time interval and a second plurality of predictor values for the mechanical process occurring during or before the second time interval, the first time interval preceding the second time interval;

determining an error value via the processor based on the estimated outcome value and the designated outcome value;

determining a drift value for the second time interval by determining one or more derivatives of a polynomial function fitted to the second plurality of predictor values;

comparing the drift value to a designated drift threshold and comparing the error value to a designated error threshold;

retraining the prediction model when it is determined that the drift value exceeds the designated drift threshold;

storing the retrained prediction model on a storage device;

determining an estimated outcome value for the mechanical process based on the retrained prediction model; and halting the mechanical process based on the estimated outcome value meeting a designated condition.

* * * * *